United States Patent [19]

Dinsmore et al.

[11] Patent Number: 5,154,735

[45] Date of Patent: Oct. 13, 1992

[54] PROCESS FOR RECOVERING HYDROCARBONS FROM AIR-HYDROCARBON VAPOR MIXTURES

[75] Inventors: Harold L. Dinsmore; Michael I. Lishnevsky; Willard N. Tuttle, all of Tulsa, Okla.

[73] Assignee: John Zink Company, a division of Koch Engineering Co., Inc., Tulsa, Okla.

[21] Appl. No.: 766,957

[22] Filed: Sep. 25, 1991

Related U.S. Application Data

[63] Continuation of Ser. No. 501,118, Mar. 29, 1990, abandoned.

[51] Int. Cl.$^5$ .............................................. B01D 53/04
[52] U.S. Cl. ........................................... 55/25; 55/26; 55/58; 55/387
[58] Field of Search .................. 55/25, 58, 387, 26, 55/57

[56] References Cited

U.S. PATENT DOCUMENTS

| | | | |
|---|---|---|---|
| 3,498,025 | 3/1970 | Bednarski | 55/58 X |
| 4,066,423 | 1/1978 | McGill et al. | 55/48 |
| 4,261,716 | 4/1981 | Schwartz et al. | 55/387 |
| 4,276,058 | 6/1981 | Dinsmore | 55/48 |
| 4,305,734 | 12/1981 | McGill | 55/25 |
| 4,338,101 | 7/1982 | Tuttle | 55/48 |
| 4,343,629 | 8/1982 | Dinsmore | 55/28 |
| 4,462,811 | 7/1984 | Dinsmore | 55/18 |
| 4,670,028 | 6/1987 | Kennedy | 55/58 X |
| 4,810,265 | 3/1989 | Lagree et al. | 55/58 X |
| 4,813,977 | 3/1989 | Schmidt et al. | 55/58 X |
| 4,880,443 | 11/1989 | Miller et al. | 55/58 X |

*Primary Examiner*—Richard L. Chiesa
*Attorney, Agent, or Firm*—Laney, Dougherty, Hessin & Beavers

[57] ABSTRACT

An improved process for recovering hydrocarbons from an air-hydrocarbon vapor mixture such as the mixture of air and vaporized light hydrocarbon compounds expelled as a result of loading gasoline, benzene or the like into storage tanks and tank trucks. The air-hydrocarbon vapor mixture is caused to flow through a bed of solid adsorbent whereby the hydrocarbons are removed from the mixture and a residue gas stream comprised of substantially hydrocarbon-free air is produced. The substantially hydrocarbon-free air is vented to the atmosphere and a second bed of solid adsorbent having hydrocarbons adsorbed thereon is subjected to conditions which cause desorption of the hydrocarbons and thereby regeneration of the bed. The regeneration of the bed is accomplished by evacuating the bed by means of liquid seal pump vacuum pumping whereby a major portion of the hydrocarbons are desorbed therefrom and subsequently subjecting the bed to further evacuation by both positive displacement booster pump vacuum pumping and by liquid seal pump vacuum pumping whereby additional hydrocarbons are desorbed therefrom.

17 Claims, 3 Drawing Sheets

PROCESS FOR RECOVERING HYDROCARBONS FROM AIR-HYDROCARBON VAPOR MIXTURES

"This is a continuation of copending application(s) Ser. No. 07/501,118 filed on Mar. 29, 1990 now abandoned."

BACKGROUND OF THE INVENTION

1. Field of the Invention

The present invention relates to a process and apparatus for recovering hydrocarbons from air-hydrocarbon vapor mixtures, and more particularly, but not by way of limitation, to an improved process and apparatus for recovering vaporized gasoline light ends and the like from a mixture thereof with air expelled from tank trucks and the like.

2. Description of the Prior Art

In handling multicomponent and single component hydrocarbon liquids such as gasoline, kerosene, benzene and the like, air-hydrocarbon vapor mixtures are readily produced which cannot be vented directly to the atmosphere due to the resulting pollution of the environment and fire and/or explosion hazard. Consequently, a variety of processes and apparatus have been developed and used for removing hydrocarbon vapors from such air-hydrocarbon vapor mixtures whereby the remaining air can be safely vented to the atmosphere. The removed hydrocarbons are generally liquefied and recombined with the hydrocarbon liquid from which they were vaporized thereby making their recovery economically advantageous.

A process for the recovery of light mixed hydrocarbon vapors from an air-hydrocarbon mixture expelled as a result of storage breathing or loading of a vented hydrocarbon vessel is described in U.S. Pat. No. 4,066,423. In accordance with such process, the air-hydrocarbon vapor mixture from which hydrocarbons are to be removed and recovered is passed through a bed of solid adsorbent having an affinity for hydrocarbons. As the mixture passes through the bed, a major portion of the hydrocarbons contained in the mixture are adsorbed on the bed and a residue gas stream is produced which is comprised of substantially hydrocarbon-free air. While a first bed of solid adsorbent is adsorbing hydrocarbons from the mixture, a second bed of solid adsorbent having hydrocarbons adsorbed thereon is regenerated by evacuation. The completeness of the regeneration of the solid adsorption beds of the process is dependent solely on the degree of vacuum produced in the beds by the vacuum pump utilized. Because vacuum pumps are incapable of achieving total vacuum, i.e., lowering the absolute pressure exerted on the beds to zero, a quantity of hydrocarbons are left adsorbed on the beds after regeneration which reduces the capacity of the beds to adsorb additional hydrocarbons and reduces the service life of the adsorbent.

The hydrocarbon-rich air-hydrocarbon mixture produced as a result of the regeneration of the bed is contacted with a liquid absorbent whereby hydrocarbons are removed therefrom and the residue gas stream from the absorption step is recycled to the bed through which the inlet air-hydrocarbon mixture is flowing. In accordance with the teachings of U.S. Pat. No. 4,066,423, the liquid absorbent utilized is liquid hydrocarbons condensed from the air-hydrocarbon vapor mixture produced in the evacuation regeneration step. More specifically, the hydrocarbon-rich air-hydrocarbon vapor mixture is cooled whereby portions of the hydrocarbons are condensed and such condensed hydrocarbons are circulated into contact with the remaining air-hydrocarbon vapor mixture whereby hydrocarbon vapors are absorbed by the liquids.

Numerous other processes and apparatus for recovering hydrocarbons from air-hydrocarbon vapor mixtures or otherwise treating said mixtures have been developed and used heretofore. In all of the prior processes which utilize solid adsorbent for removing hydrocarbons from air-hydrocarbon vapor mixtures, regeneration of the adsorbent is incomplete whereby hydrocarbons are left on the adsorbent reducing the capacity, efficiency and service life thereof.

As is well understood by those skilled in the art, all of the prior art processes described above as well as the process of the present invention can be utilized in applications where the hydrocarbons to be recovered are mixed with inert gases other than air, e.g., nitrogen. Therefore, it is to be understood that while for convenience, the inert gas-hydrocarbon mixtures described in connection with the present invention are referred to as air-hydrocarbon vapor mixtures, the present invention is equally applicable to other inert gas-hydrocarbon vapor mixtures.

As various government regulatory agencies have enacted and enforced hydrocarbon vapor control emission regulations applicable to petroleum product transfer operations, it has been recognized that it is appropriate and fair to state the regulations in a form that relates the allowable level of hydrocarbon emissions into the atmosphere to the volume of liquid transferred. Beginning in the late 1970's and continuing until August, 1983, the United States Environmental Protection Agency (EPA) hydrocarbon vapor emission standard for gasoline bulk terminals was to allow 80 milligrams (mg) of hydrocarbon vapor to be emitted per liter (1) of gasoline product transferred. In August, 1983, the EPA revised the emission standard to limit the allowable hydrocarbon vapor emissions from a gasoline bulk terminal to 35 milligrams of hydrocarbon vapor per liter of gasoline product transferred. Since then, various air quality regulatory agencies have enacted even more stringent regulations involving transfer operations of volatile hydrocarbon liquids. For example, current regulations limit hydrocarbon vapor emissions from gasoline bulk terminals in some regions of California to 10 milligrams per liter. Current regulations applicable for marine transfer operations involving gasoline and crude oil in the San Francisco Bay area of California, limit the allowable hydrocarbon vapor emission level to 5.7 milligram per liter of liquid transferred. Furthermore, it is anticipated that these allowable emission standards will continue to become more and more stringent. It is expected that many countries in Europe will be required to comply with the proposed German standard which will only allow 0.15 milligrams of hydrocarbon vapor to be emitted per liter of vent gas.

The prior art carbon adsorption/absorption processes and systems which are based on the use of liquid ring vacuum pumps combined with air purge for carbon bed regeneration, have been shown to be capable of complying with allowable emission regulations of 10 mg/1 or higher. Under low capacity utilization, they have demonstrated emission performance in the 1 to 10 mg/1 range. However, the latter type of performance represents unusual circumstances which can not be obtained consistently.

The prior art carbon adsorption/absorption processes and systems presently being used are limited by the liquid ring vacuum pumps utilized to the level of vacuum that can be obtained thereby to regenerate the adsorbent beds. Generally this vacuum level is limited by the vapor pressure of the liquid seal fluid required to make the vacuum pump work. Practical vacuum levels that can be achieved by this type of vacuum pump correspond to absolute pressure levels of between 50 and 100 millimeters (mm) of mercury (Hg). This limitation of vacuum limits the degree to which the carbon beds can be regenerated and therefore limits the hydrocarbon vapor recovery efficiency.

By the present invention, an improved process and apparatus is provided which allows significantly greater carbon bed regeneration vacuum levels to be achieved, i.e., vacuum levels equivalent to absolute pressure levels of 1 mm Hg or less. This greater vacuum level combined with high vacuum air purge achieves greater carbon bed regeneration and, as a result, significantly lower hydrocarbon vapor emission levels are obtained, i.e., levels equal to or lower than even the most stringent regulation (German) of 0.15 mg/1 proposed for gasoline transfer operations.

SUMMARY OF THE INVENTION

An improved process for recovering hydrocarbons from an inlet air-hydrocarbon vapor mixture comprising flowing the inlet mixture through a first bed of solid adsorbent whereby hydrocarbons are adsorbed on the bed and a residue gas stream comprised of substantially hydrocarbon-free air which is vented to the atmosphere is produced. A second bed of solid adsorbent having hydrocarbons adsorbed thereon is evacuated and thereby regenerated by vacuum pumping with a liquid seal vacuum pump whereby a major portion of the hydrocarbons are desorbed from the bed and a hydrocarbon-rich air-hydrocarbon mixture is produced. The second bed is further evacuated by vacuum pumping with a positive displacement booster pump connected upstream and in series with the liquid seal vacuum pump while continuing to pump with the liquid seal vacuum pump. Hydrocarbon free air is preferably injected into the bed being regenerated when high vacuum conditions are reached to strip additional hydrocarbons from the bed, all of which results in the bed being regenerated to a greater degree than heretofore possible and/or practical.

A major portion of the hydrocarbons in the air-hydrocarbon mixture produced as a result of the evacuation of the second bed are removed therefrom, and a residue gas stream comprised of air and a minor portion of hydrocarbons is produced. The residue gas stream is combined with the inlet air-hydrocarbon mixture whereby it flows through the first adsorbent bed and hydrocarbons are removed therefrom. The flow pattern of the inlet air-hydrocarbon mixture and the bed of solid adsorbent being evacuated are periodically changed whereby when the bed through which the inlet air-hydrocarbon mixture is flowing becomes loaded with adsorbed hydrocarbons, the inlet air-hydrocarbon mixture is caused to flow through the bed which has just been evacuated. Apparatus for carrying out the improved process of this invention is also provided.

It is, therefore, a general object of the present invention to provide an improved process and apparatus for recovering hydrocarbons from air-hydrocarbon vapor mixtures.

A further object of the present invention is the provision of a process and apparatus whereby-hydrocarbons contained in an air-hydrocarbon mixture are adsorbed on a bed of solid adsorbent and the bed is regnerated more completely than prior processes.

Yet a further object of the present invention is the provision of a process and apparatus for recovering hydrocarbons from an air-hydrocarbon vapor mixture whereby the substantially hydrocarbon free air vented to the atmosphere contains a very low hydrocarbon content.

Other and further objects, features and advantages of the present invention will be readily apparent to those skilled in the art upon a reading of the description of preferred embodiments which follows when taken in conjunction with the accompanying drawing.

DESCRIPTION OF PREFERRED EMBODIMENTS

Figure 1:
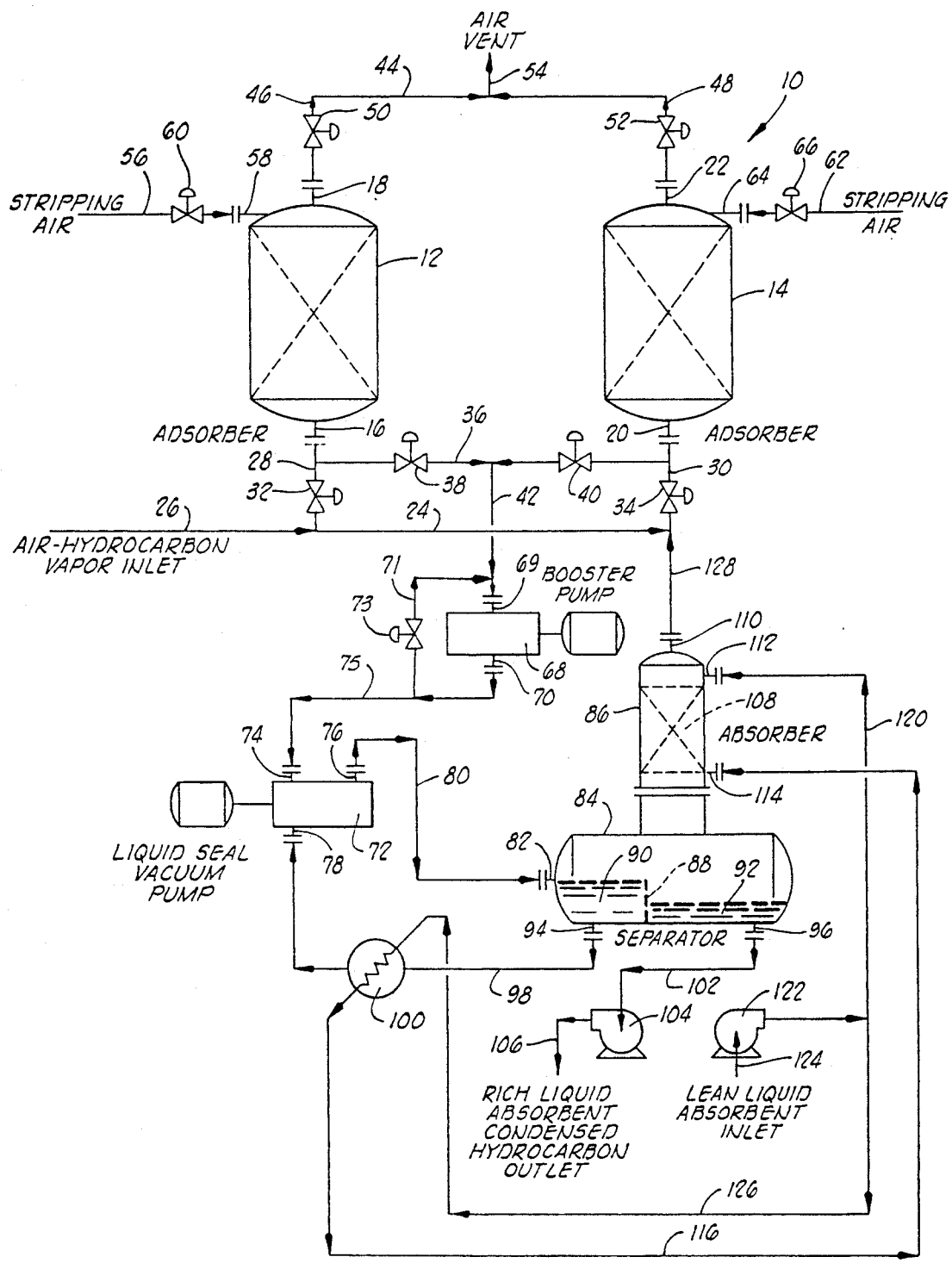
FIG. 1 is a schematic illustration of apparatus of the present invention for carrying out the process of the invention.

Referring to FIG. 1, apparatus of the present invention is illustrated and generally designated by the numeral 10. The apparatus 10 is comprised of a pair of adsorbers 12 and 14, each of which contains a bed of solid adsorbent through which gases can flow. Each of the adsorbers 12 and 14 are closed vessels and include connections positioned on opposite sides of the beds of adsorbent contained therein. That is, the adsorber 12 includes inlet and outlet connections 16 and 18 and the adsorber 14 includes inlet and outlet connections 20 and 22. While various solid adsorbents having an affinity for hydrocarbons can be utilized in the adsorbers 12 and 14, activated carbon is preferred in that it is particularly suitable for adsorbing light hydrocarbon vapors of the type found in air-hydrocarbon vapor mixtures and for vacuum regeneration.

An air-hydrocarbon vapor mixture inlet header 24 is provided connected to a conduit 26 which conducts a mixture of air and multi-component hydrocarbon vapor, e.g., gasoline or kerosene vapor, from a source thereof to the apparatus 10. A pair of conduits 28 and 30 are connected to the header 24 and to the connections 16 and 20 of the adsorbers 12 and 14, respectively. Conventional switching valves 32 and 34 are disposed in the conduits 28 and 30, respectively, and a header 36 is connected to the conduits 28 and 30 at points thereon between the switching valves 32 and 34 and the connections 16 and 20 of the adsorbers 12 and 14. A pair of switching valves 38 and 40 are disposed in the header 36 and a conduit 42 is connected to the header 36 at a point between the switching valves 38 and 40.

A residue gas header 44 is provided, and a pair of conduits 46 and 48 are connected to the header 44 and to the connections 18 and 22 of the adsorbers 12 and 14. Switching valves 50 and 52 are disposed in the conduits 46 and 48, respectively, and a conduit 54 is connected to the header 44 for venting substantially hydrocarbon free residue gas to the atmosphere.

A conduit 56 connected to a source (not shown) of stripping air or other inert gas, which can optionally be heated, is connected to a stripping air inlet connection 58 in the adsorber 12. A switching valve 60 is disposed in the conduit 56. In a like manner, stripping air is conducted to the adsorber 14 by a conduit 62 connected to a connection 64 in the adsorber 14. A switching valve 66 is disposed in the conduit 62.

The other end of the conduit 42 connected to the header 36 is connected to the suction connection 69 of a positive displacement booster pump 68. The booster pump 68 is preferably a rotary blower of the lobed rotor design. An example of a particularly suitable such positive displacement rotary blower for use in accordance with the present invention is the lobed rotor booster pump manufactured and sold by the M-D Pneumatics Division of the Tuthill Corporation, Springfield, Missouri. The discharge connection 70 of the booster pump 68 is connected to a conduit 75. A spillback conduit 71 is disposed around the booster pump 68 and is connected to the conduits 42 and 75. A switching valve 73 is disposed in the spillback conduit 71.

The primary vacuum pump utilized in accordance with this invention is a conventional liquid seal vacuum pump, also known as a liquid ring vacuum pump. Liquid seal vacuum pumps are capable of producing high vacuums, are relatively inexpensive and are much safer than other types of vacuum pumps. A liquid seal vacuum pump utilizes a seal liquid which is circulated through the pump. The seal liquid can be confined in a closed circuit and cooled whereby the pump is continuously cooled and the gas or gases flowing through the pump are also cooled. The presence of the seal liquid in the pump minimizes the possibility of explosions since the gas cannot approach its auto-ignition temperature nor can sparking occur due to mechanical failures within the pump.

A liquid seal vacuum pump 72 having a suction connection 74 to which the conduit 75 is attached, a discharge connection 76 and a seal liquid inlet connection 78 for returning seal liquid thereto is provided. A conduit 80 is connected to the discharge connection 76 of the pump 72 and to an inlet connection 82 of a separator 84. In the embodiment illustrated in FIG. 1, an absorber 86 is integrally connected to the top of the separator 84, but as will be understood, the absorber 86 and separator 84 can be separate vessels.

The separator 84 is a three phase separator capable of separating the seal liquid utilized for the pump 72, condensed hydrocarbons and an air-hydrocarbon vapor mixture from each other. Also, in the embodiment illustrated in FIG. 1, the separator 84 includes a chamber for accumulating separated condensed hydrocarbon liquids and hydrocarbon-rich liquid absorbent entering the separator 84 from the absorber 86 whereby such liquids are removed from the separator 84 is a combined state. More specifically, the separator 84 includes a weir 88 which divides the separator into a forward compartment 90 and a rearward compartment 92. The seal liquid and condensed hydrocarbon liquids entering the separator 84 by way of the inlet connection 82 are separated from the air-hydrocarbon vapor mixture in the forward compartment 90. The seal liquid is heavier than the condensed hydrocarbon liquids and is immiscible therewith, and consequently, the seal liquid accumulates in the bottom of the forward compartment 90 from where it is removed by way of a seal liquid outlet connection 94 attached to the separator 84. Condensed hydrocarbon liquids accumulating in the compartment 90 spill over the top of the weir 88 into the compartment 92. Hydrocarbon-rich liquid absorbent from the absorber 86 enters the compartment 92 by way of the open bottom of the absorber 86 connected to the top of the separator 84 and also accumulates in the compartment 92. The rich liquid absorbent-condensed hydrocarbon liquid mixture is removed from the separator 84 by way of an outlet connection 96. The separated air-hydrocarbon vapor mixture passes from the separator 84 into the absorber 86 by way of the connection therebetween.

A conduit 98 is connected to the seal liquid outlet connection 94 of the separator 84 and to the seal liquid inlet connection 78 of the pump 72. A cooler 100 is disposed in the conduit 98 for cooling the seal liquid as it flows therethrough. In certain situations a seal fluid circulation pump can be disposed in the conduit 98 between the separator 84 and the cooler 100. While the cooler 100 can be of various types and designs, a heat exchanger which cools the seal liquid by passing it in heat exchange relationship with a stream of lean liquid of the same characteristics as that used as the absorption medium in the absorber 86 is preferred and generally is the most economical.

A conduit 102 is connected to the connection 96 of the separator 84 and to a rich liquid absorbent-condensed hydrocarbon liquids pump 104. The discharge connection of the pump 104 is connected to a conduit 106 which leads the rich liquid absorbent-condensed hydrocarbon liquids mixture to a storage facility (not shown).

The absorber 86 includes means disposed therein for bringing about intimate contact between a liquid absorbent flowing downwardly therein and a vapor mixture flowing upwardly. Such means can be comprised of vapor-liquid contact trays or any of a variety of conventional packing material. Preferably, the absorber 86 includes a section of packing material 108 disposed in the top portion thereof for bringing about the intimate contact. A residue gas outlet connection 110 and a lean liquid absorbent inlet connection 112 are provided above the packed section 108. As described above, in the embodiment shown in FIG. 1, the open bottom of the absorber 86 is sealingly connected to the top of the separator 84 over an opening in the separator 84 whereby rich liquid absorbent produced in the absorber 86 flows downwardly out of the absorber and into the separator 84. In a like manner, the mixture of air and hydrocarbon vapor separated in the separator 84 flows upwardly to the open bottom of the absorber into contact with the liquid absorbent flowing downwardly therein whereby hydrocarbons are absorbed and removed from the vapor mixture and a residue gas stream comprised of air and a minor portion of hydrocarbons is produced.

A conduit 120 is connected to the lean liquid absorbent inlet 112 of the absorber 86 and to the discharge connection of a pump 122. A conduit 124 is connected to the suction connection of the pump 122 which leads a stream of lean liquid absorbent from a source thereof such as a storage tank to the pump 122. As indicated above, a conduit 126 can be provided to connect conduit 120 with cooler 100 whereby a slip stream of lean liquid absorbent flows to an inlet connection 114 in the absorber 86 by way of a conduit 116.

In certain cases, the lean liquid absorbent may be too warm to use directly as an absorbent and seal fluid heat exchange coolant. In such cases, an exchanger (not shown) can be disposed in conduit 120 for cooling the lean liquid absorbent with an appropriate cooling medium such as cooling water, refrigerant, etc.

The residue gas stream produced in the absorber 86 exits the absorber by way of the connection 110 thereof and flows into a conduit 128 connected thereto and connected to the inlet air-hydrocarbon vapor header 24.

As will be understood by those skilled in the art, the switching valves 32, 34, 38, 40, 50, 52, 60, 66 and 73 can be operated manually, but are preferably automatically operated valves which are controlled by a conventional cycle controller. The length of each cycle, i.e., the period of time between when the switching valves are operated can be controlled by a timer or other instrument sensing one or more variables in the operation of the apparatus 10, such as the degree of vacuum achieved in the adsorbent bed being regenerated, the composition of the gas stream being vented to the atmosphere, etc.

Operation of the Apparatus 10

In operation of the apparatus 10, the switching valves 32, 34, 38, 40, 50 and 52 are operated in a manner whereby the inlet air-hydrocarbon vapor mixture is caused to flow through one of the adsorbers 12 or 14 while the other of the adsorbers is being regenerated. For example, during a first cycle, the switching valve 32 is open and the switching valve 34 closed whereby the inlet air-hydrocarbon vapor mixture flows into the adsorber 12 by way of the conduit 28, switching valve 32 and connection 16 of the adsorber 12. Because the switching valve 34 disposed in the conduit 30 is closed, the inlet air-hydrocarbon vapor mixture is prevented from entering the adsorber 14. The switching valve 50 disposed in the conduit 46 is open and the switching valve 52 disposed in the conduit 48 is closed whereby the residue gas stream produced in the adsorber 12 exits the adsorber 12 by way of the connection 18 thereof, the conduit 46 and the switching valve 50 and enters the header 44. From the header 44, the residue gas stream flows through the conduit 54 from where it is vented to the atmosphere. The switching valve 38 disposed in the header 36 is closed, and the switching valve 40 disposed therein is open whereby the adsorbent bed within the adsorber 14 is communicated by way of the conduit 42 with the booster pump 68, and by way of the conduit 75 with the suction connection 74 of the liquid seal vacuum pump 72. The switching valve 66 disposed in the conduit 62 is initially closed and the switching valve 73 in the spillback conduit 71 is initially open.

During the first part of the cycle when the switching valves are in the mode described above, the inlet air-hydrocarbon vapor mixture flows through the bed of adsorbent within the adsorber 12 whereby hydrocarbons are adsorbed on the bed and removed from the mixture. The residue gas produced which is comprised of substantially hydrocarbon-free air is vented to the atmosphere by way of the air vent 54. Simultaneously, the bed of adsorbent disposed within the adsorber 14 is evacuated by the liquid seal vacuum pump whereby hydrocarbons are desorbed therefrom. A hydrocarbon-rich air-hydrocarbon vapor mixture is withdrawn from the adsorbent bed within the adsorber 14. Cooled seal liquid, preferably water or a mixture of water and a substance which functions as an antifreeze agent in the winter and as an agent to lower seal fluid vapor pressure in the summer, e.g., ethylene glycol, flows into the vacuum pump 72 by way of the connection 78 thereof and is discharged by way of the discharge connection 76 with the air-hydrocarbon vapor mixture. The intimate contact of the air-hydrocarbon vapor mixture with the cool seal liquid while flowing through the vacuum pump 72 cools the vapor mixture and causes some of the hydrocarbons contained therein to be condensed. Thus, a stream of air-hydrocarbon vapor mixture containing both seal liquid and condensed hydrocarbons exits the pump 72 and flows through the conduit 80 into the separator 84. While passing through the separator 84, the air-hydrocarbon vapor mixture, seal liquid and condensed hydrocarbon liquids are separated from each other. As previously described, the separated seal liquid flows from the separator 84 by way of the connection 94 thereof, the conduit 98 and the cooler 100 back into the liquid seal vacuum pump 72. Thus, the seal liquid is continually circulated between the pump 72, the separator 84 and the cooler 100 while the pump 72 is operating.

The separated condensed hydrocarbons spill over the weir 88 and flow into the compartment 92 of the separator 84 where they combine with rich liquid absorbent flowing into the compartment 92 from the absorber 86 and removed therefrom by way of the connection 96 thereof, the conduit 102 and the pump 104. From the pump 104, the rich liquid absorbent-condensed hydrocarbon liquids mixture is conducted by way of the conduit 106 to storage facilities or a point of further processing (not shown).

A stream of lean liquid absorbent is pumped from a source thereof by the pump 122 and flows by way of the conduit 124, conduit 120 and connection 112 into the absorber 86. The lean liquid absorbent flows downwardly within the absorber 86 through the packed section 108 thereof and intimately contacts the separated air-hydrocarbon mixture flowing upwardly therethrough from the separator 84. As the air-hydrocarbon vapor mixture is contacted by the liquid absorbent, hydrocarbons are absorbed by the liquid absorbent and removed from the vapor mixture whereby a residue gas stream comprised of air and a minor portion of hydrocarbons is produced. The residue gas stream exits the absorber 86 by way of the connection 110 thereof and flows by way of the conduit 128 into the header 24 where it combines with the inlet air-hydrocarbon vapor mixture and flows through the adsorber 12. As will be understood, the hydrocarbons contained in the residue gas stream are adsorbed on the bed of adsorbent within the adsorber 12 along with hydrocarbons from the inlet air-hydrocarbon vapor mixture.

In the embodiment illustrated in FIG. 1, the booster pump 68 operates continuously but because the valve 73 in the spillback conduit 71 is open during the initial part of each cycle, the booster pump 68 is unloaded and the vacuum is created in the adsorber 14 by the liquid seal vacuum pump 72 alone. During a latter portion of the regeneration cycle, the switching valve 73 in the spillback conduit 71 is closed. The closing of the switching valve 71 loads the booster pump 68 causing a suction to be produced in addition to the suction produced by the liquid seal vacuum pump 72 which is exerted on the bed of adsorbent within the adsorber 14 thereby creating a deeper vacuum than that created by the liquid seal pump 72 alone thereby further evacuating the adsorber 14 and causing additional hydrocarbons to be desorbed therefrom.

During the last part of the cycle, after a major portion of hydrocarbons adsorbed on the bed of adsorbent within the adsorber 14 have been desorbed therefrom by the operation of the liquid seal vacuum pump 72 and the booster pump 68 the switching valve 66 in the conduit 62 is opened whereby a quantity of hydrocarbon-free stripping air flows by way of the conduit 62, switching valve 66 and the connection 64 of the adsorber 14 into the adsorber 14. The stripping air flows through the bed of adsorbent contained in the adsorber 14 and is withdrawn therefrom by the booster pump 68 and the liquid seal vacuum pump 72 as previously described. The introduction of a quantity of stripping air into the adsorbent bed contained within the adsorber 14 functions to strip additional hydrocarbons from the bed which were not desorbed therefrom by vacuum pumping, i.e., by the lowering of the pressure exerted on the bed to the degree of vacuum achieved by the combined pumping of the booster pump 68 and the liquid seal vacuum pump 72.

Thus, as will be apparent, the combination of initially evacuating the adsorber 14 by vacuum pumping with the liquid seal vacuum pump 72, further evacuating the adsorbent bed by loading the booster pump 68 and then stripping the adsorbent bed brings about the regeneration of the adsorbent bed to a greater degree than is possible by liquid seal vacuum pumping alone. This more complete regeneration of the bed increases the capacity of the bed to adsorb additional hydrocarbons, increases the overall hydrocarbon recovery efficiency of the apparatus 10, increases the service life of the adsorbent and, if desired, produces a substantially hydrocarbon free residue air of lower hydrocarbon content.

After the adsorbent bed within the adsorber 14 has been fully regenerated and the adsorbent bed within the adsorber 12 loaded with hydrocarbons from the air-hydrocarbon vapor mixture flowing therethrough, the switching valve 73 in the conduit 71 is opened, the switching valve 66 is closed and the other switching valves of the apparatus 10 are reversed. That is, the switching valves 32 and 50 are closed, the switching valves 34 and 52 are opened, the switching valve 38 is opened and the switching valve 40 is closed. This causes the flow pattern of the inlet air-hydrocarbon vapor mixture to be changed whereby the mixture flows through the regenerated adsorbent bed within the adsorber 14 and the residue gas therefrom to be vented to the atmosphere. The adsorbent bed within the adsorber 12 is simultaneously communicated with the vacuum pump 72 whereby it is evacuated and the switching valves 73 and 60 are closed and opened, respectively, during a latter part of the cycle as described above to further evacuate the adsorbent bed and to strip it whereby additional hydrocarbons are desorbed therefrom.

As will be understood by those skilled in the art, the flow pattern of the inlet air-hydrocarbon vapor mixture and the bed being regenerated are continuously changed or cycled whereby when the adsorbent bed through which the inlet vapor mixture is flowing becomes loaded with adsorbed hydrocarbons, the inlet mixture is caused to flow into the bed which has just been regenerated. The hydrocarbon-rich air-hydrocarbon vapor mixture produced from the bed being regenerated is continuously contacted with liquid adsorbent in the absorber 86 whereby the hydrocarbons are recovered.

The apparatus 10 is particularly suitable for recovering vaporized multi-component hydrocarbons, such as gasoline light ends, mixed with air produced as a result of loading tank trucks and other vessels. In the application where the air-hydrocarbon vapor mixture is air-gasoline light ends, the liquid absorbent utilized is gasoline. That is, stored gasoline is pumped from a storage facility into the absorber 86 and the rich gasoline and condensed hydrocarbon liquids produced by the apparatus 10 are returned to a gasoline storage facility. Because the stored gasoline is continuously being loaded out of the storage facilities and replaced by newly produced gasoline, the stream of gasoline pumped to the absorber is lean enough to efficiently absorb gasoline light ends, even when a single gasoline storage facility is utilized.

Figure 2:
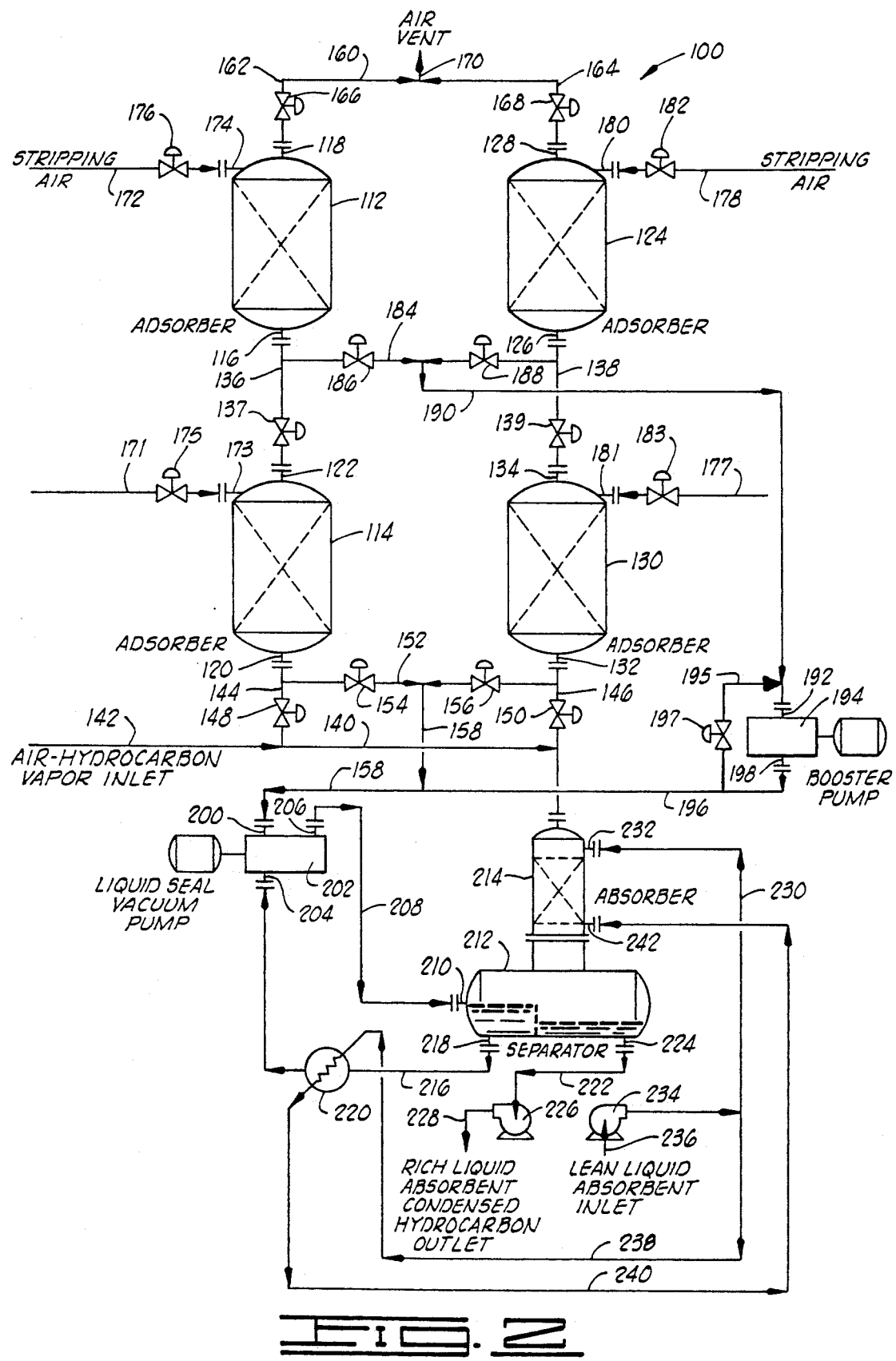
FIG. 2 is a schematic illustration of an alternate form of apparatus of the invention.

Referring now to FIG. 2 an alternate form of apparatus of the present invention is illustrated and generally designated by the numeral 100. The apparatus 100 is identical to the apparatus 10 described above, except that instead of the absorbers 12 and 14 including first and second beds of adsorbent, the apparatus 100 includes two pairs of serially connected adsorbers, each pair including upstream and downstream adsorbent beds contained in separate adsorber vessels. That is, in place of the first bed in the single adsorber 12, the apparatus 100 includes an upstream (when being regenerated) adsorber 112 having first and second connections 116 and 118, and a downstream adsorber 114 having first and second connections 120 and 122. Instead of a single second adsorber 14, the apparatus 100 includes an upstream adsorber 124 having connections 126 and 128 and a downstream adsorber 130 having connections 132 and 134. The connection 116 of the upstream adsorber 112 is connected to the connection 122 of the downstream adsorber 114 by a conduit 136, and in a like manner, the connection 126 of the upstream adsorber 124 is connected to the connection 134 of the downstream adsorber 130 by a conduit 138.

An air-hydrocarbon vapor mixture inlet header 140 is provided connected to a conduit 142 which conducts a mixture of air and multi-component hydrocarbon vapor, e.g., gasoline or kerosene vapor, from a source thereof to the apparatus 100. A pair of conduits 144 and 146 are connected to the header 140 and to the connections 120 and 132 of the downstream adsorbers 114 and 130, respectively. Switching valves 148 and 150 are disposed in the conduits 144 and 146, respectively, and a header 152 is connected to the conduits 144 and 146 at points thereon between the switching valves 148 and 150 and the connections 120 and 132 of the adsorbers 114 and 130. A pair of switching valves 154 and 156 are disposed in the header 152, and a conduit 158 is connected to the header 152 at a point between the switching valves 154 and 156.

A residue gas header 160 is provided, and a pair of conduits 162 and 164 are connected to the header 160 and to the connections 118 and 128 of the upstream adsorbers 112 and 124, respectively. Switching valves 166 and 168 are disposed in the conduits 162 and 164, respectively, and a conduit 170 is connected to the header 160 for venting substantially hydrocarbon free residue gas, i.e., air, to the atmosphere.

A stripping air conduit 172 is provided connected to a source of air and to a stripping air inlet connection 174 in the adsorber 112. A stripping air conduit 178 conducts stripping air to the adsorber 124 by way of a switching valve 182 and inlet connection 180.

A switching valve 137 is disposed in the conduit 136 and a switching valve 139 is disposed in the conduit 138. A stripping air conduit 171 is connected to a stripping air inlet connection 173 in the adsorber 114. A switching valve 175 is disposed in the conduit 171. In a like manner, a stripping air conduit 177 conducts stripping air to the adsorber 130 by way of a switching valve 183 and inlet connection 181.

A booster pump suction header 184 is provided connected between the conduits 136 and 138. Switching valves 186 and 188 are disposed in the header 184, and a conduit 190 is connected to the header 184 between the switching valves 186 and 188 and to the suction connection 192 of a booster pump 194. The booster pump 194 is identical to the booster pump 68 described above, and a conduit 196 is connected to the discharge connection 198 thereof. A spillback conduit 195 is connected between the conduits 190 and 196, and a switching valve 197 is disposed in the spillback conduit 195.

The conduit 196 is connected to the conduit 158 previously described which is connected to the suction connection 200 of a liquid seal vacuum pump 202. The liquid seal vacuum pump 202 includes a discharge connection 206 and a seal liquid inlet connection 204 for returning seal liquid thereto. A conduit 208 is connected to the discharge connection 206 of the pump 202 and to an inlet connection 210 of a 3-phase separator 212. An absorber 214 is integrally connected to the top of the separator 212. The separator 212 and absorber 214 are identical to the separator 84 and absorber 86 described above relating to the apparatus 10. A conduit 216 is connected to a seal liquid outlet connection 218 of the separator 212 and to the seal liquid inlet connection 204 of the liquid seal vacuum pump 202. A cooler 220 is disposed in the conduit 216 for cooling the seal liquid as it flows therethrough. A conduit 222 is connected to the rich liquid absorbent-condensed hydrocarbon liquids outlet connection 224 of the separator 212 and to a rich liquid absorbent-condensed hydrocarbon liquids pump 226. The discharge of the pump 226 is connected to a conduit 228 which leads the hydrocarbons to a storage facility (not shown). A conduit 230 is connected to the lean liquid absorbent inlet 232 of the absorber 214 and to the discharge connection of a pump 234. A conduit 236 is connected to the suction connection of the pump 234 which leads a stream of lean liquid absorbent from a source thereof to the pump 234. A conduit 238 connected to the conduit 230 conducts a side stream of lean liquid absorbent to the cooler 220 as the cooling medium therefor, and a conduit 240 connected to the cooler 220 returns the side stream of liquid absorbent to the absorber 214 by way of an inlet connection 242 therein.

Operation of the Apparatus 100

The operation of the apparatus 100 is similar to the operation of the apparatus 10 described above except that during each cycle the inlet air hydrocarbon vapor mixture is caused to flow through one of the pairs of serially connected absorbers while the other pair is being regenerated. For example, during a first cycle, the switching valves 148, 137 and 166 are open and the switching valves 150, 168 and 186 are closed whereby the inlet air-hydrocarbon vapor mixture flows into the adsorber 114 by way of the conduit 144.

From the adsorber 114 the air-hydrocarbon vapor mixture flows by way of the conduit 136 and open valve 137 through the adsorber 112. From the adsorber 112 the substantially hydrocarbon-free air produced is vented to the atmosphere by way of the conduit 162, the open valve 166, the header 160 and the conduit 170.

Simultaneously, the beds of adsorbent within the serially connected adsorbers 124 and 130 are regenerated by evacuation. That is, during a first part of the cycle, a hydrocarbon-rich air-hydrocarbon vapor mixture is withdrawn from the upstream and downstream adsorbent beds within the adsorbers 124 and 130, respectively, by way of the liquid seal vacuum pump 202. That is, the upstream and downstream beds of adsorbent within the adsorber 124 and the adsorber 130 are evacuated by the liquid seal vacuum pump 202 whereby hydrocarbons are desorbed from the beds. The air-hydrocarbon vapor mixture produced is withdrawn from the upstream adsorbent bed within the adsorber 124 by way of the conduit 138 and the open switching valve 139. The valve 188 in the header 184 is closed during the initial part of the cycle and the spillback valve 197 in the spillback conduit 195 around the continuously operating booster pump 194 is open.

The air-hydrocarbon vapor mixture from the adsorber 124 enters and flows through the downstream bed of adsorbent within the adsorber 130 wherein it mixes with additional desorbed air-hydrocarbon vapor mixture. The combined vapor mixture, rich in hydrocarbon vapor, is withdrawn from the adsorber 130 by way of the conduit 146, the header 152, the open switching valve 156 and the conduit 158 which is connected to the inlet connection 200 of the liquid seal vacuum pump 202. The switching valve 150 in the conduit 146 is closed. From the liquid seal vacuum pump 202, the hydrocarbon-rich air-hydrocarbon vapor mixture withdrawn from the upstream and downstream adsorbent beds within the adsorbers 124 and 130 is conducted to the separator 212, absorber 214 and related apparatus, all of which operates in an identical manner to the separator 84, absorber 86 and related equipment of the apparatus 10 described above.

During a latter part of the cycle, after a major portion of hydrocarbons adsorbed on the beds of adsorbent within the adsorbers 124 and 130 have been desorbed therefrom by the operation of the liquid seal vacuum pump 202, the switching valve 139 in the conduit 138 is closed, the switching valve 188 in the header 184 is opened, and the spillback valve 197 in the booster pump spillback conduit 195 is closed whereby the booster pump 194 is loaded and communicated with the upstream bed of adsorbent within the adsorber 124. The booster pump lowers the pressure within the adsorber 124 an additional amount and evacuates additional desorbed hydrocarbons and air therefrom. The air-hydrocarbon vapor mixture is pumped by the booster pump 194 through the conduit 196 and into the liquid seal vacuum pump suction by way of the conduit 158. Simultaneously with, or at about the same time the booster pump 194 is loaded, the switching valve 183 in conduit 177 is opened whereby hydrocarbon-free stripping air enters the downstream adsorber 130. As described above, the introduction of hydrocarbon-free air into the adsorbent bed under vacuum conditions functions to strip additional hydrocarbons from the bed.

After a greater vacuum has been achieved in the upstream adsorber 124 due to the loading of the booster pump 194, switching valve 182 in conduit 178 is opened whereby hydrocarbon-free stripping air enters the upstream adsorber 124. This stripping air functions to strip additional hydrocarbons from the adsorbent bed. Because of the combined action of the stripping air and the greater vacuum achieved therein, the upstream adsorber bed within adsorber 124 is regenerated to a greater degree than the downstream adsorbent bed in adsorber 130. During the next cycle, the inlet air-hydrocarbon vapor mixture is caused to flow through the bed in the adsorber 130 first, and then through the bed in the adsorber within the adsorber 124. Because the bed within the adsorber 124 was regenerated to a greater degree than the bed within the adsorber 130, the substantially hydrocarbon-free air leaving the adsorber 124 is purified to a greater degree.

Figure 3:
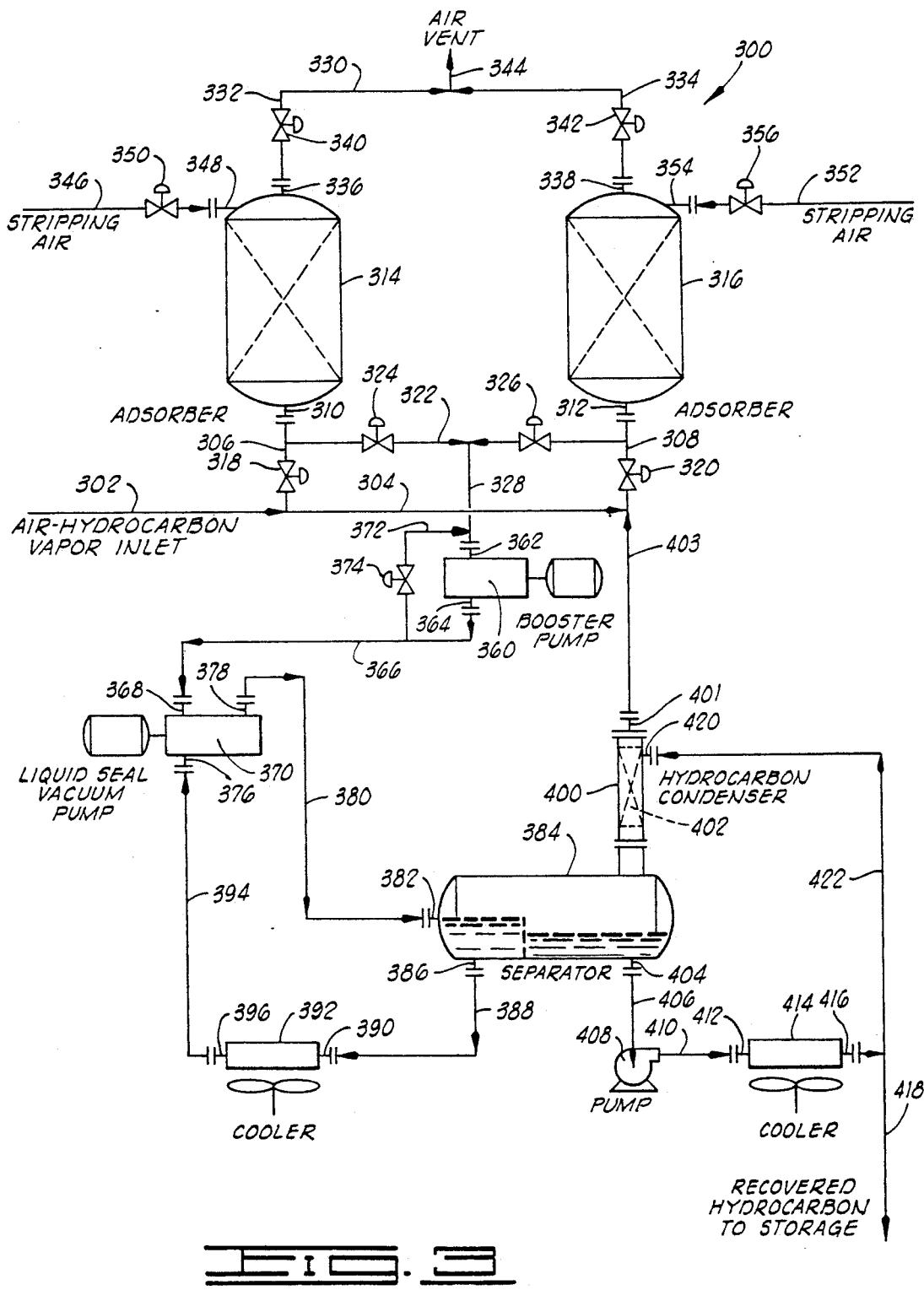
FIG. 3 is a schematic illustration of another form of apparatus for carrying out an alternate embodiment of the process of the invention.

Referring now to FIG. 3, yet another form of apparatus of the invention is illustrated and generally designated by the numeral 300. The apparatus 300 is suitable for use only for recovering hydrocarbons from an air-hydrocarbon vapor mixture in which all the hydrocarbon components are relatively non-volatile and are capable of being condensed in the absence of air at conditions near ambient, e.g., a vapor mixture of benzene and air. The apparatus 300 is not suitable for recovering hydrocarbons from an air-multi component hydrocarbon vapor mixture in which some of the hydrocarbon components are relatively volatile and will not condense at or near ambient conditions in the absence of air, e.g., air-gasoline vapor, and such air-multi component hydrocarbon mixtures must be processed using the apparatus 10 or 100, previously described.

An air-hydrocarbon vapor mixture is conducted by a conduit 302 to an inlet header 304 of the apparatus 300. A pair of conduits 306 and 308 are connected to the header 304 and to connections 310 and 312 of adsorbers 314 and 316, respectively. Switching valves 318 and 320 are disposed in the conduits 306 and 308, respectively, and a header 322 is connected to the conduits 306 and 308 at points thereon between the switching valves 318 and 320 and the connections 310 and 312 of the adsorbers 314 and 316. A pair of switching valves 324 and 326 are disposed in the header 322, and a conduit 328 is connected to the header 322 at a point between the switching valves 324 and 326.

A residue gas header 330 is provided, and a pair of conduits 332 and 334 are connected to the header 330 and to connections 336 and 338 of the adsorbers 314 and 316, respectively. Switching valves 340 and 342 are disposed in the conduits 332 and 334, respectively, and a conduit 344 is connected to the header 330 for venting substantially hydrocarbon-free residue gas to the atmosphere. A stripping air conduit conducts stripping air to the adsorber 314 by way of a switching valve 350 and an inlet connection 348. A conduit 352 conducts stripping air to the adsorber 316 by way of a switching valve 356 and an inlet connection 354.

The other end of the conduit 328 connected to the header 322 is connected to a continuously operating positive displacement booster pump 360 identical to the booster pump described in connection with the apparatus 10 above. The conduit 328 is connected to an inlet connection 362 of the booster pump 360, and the discharge connection 364 thereof is connected by a conduit 366 to the inlet connection 368 of a liquid seal vacuum pump 370. A spillback conduit 372 is connected around the booster pump 360 to the conduits 328 and 366. A switching valve 374 is disposed in the spillback conduit 372.

The liquid seal vacuum pump 370 includes a seal liquid inlet connection 376 and a discharge connection 378 which is connected to a conduit 380. The other end of the conduit 380 is connected to the inlet connection 382 of a three phase separator 384 which operates in the same manner as the separator 84 described above in connection with the apparatus 10. Separated seal liquid is withdrawn from the separator 384 by way of a seal liquid outlet connection 386 thereof, and a conduit 388 is connected between the connection 386 and the inlet connection 390 of a cooler 392. The cooler 392 can be of various types, but is preferably an air cooler, and most preferably, a water evaporative air cooler. A conduit 394 connects the outlet connection 396 of the cooler 392 to the seal liquid inlet connection 376 of the liquid seal vacuum pump 370.

Because the hydrocarbon components to be removed from the inlet air-hydrocarbon vapor mixture are relatively nonvolatile and condense at near ambient conditions, a hydrocarbon condenser 400 is used instead of an absorber as described above for the apparatus 10 and 100. The hydrocarbon condenser 400 can take various forms. In the embodiment shown in FIG. 3, the condenser 400 is a column connected directly to the top of the separator 384. The column can include a packed section 402 therewithin for bringing about intimate contact between the air-hydrocarbon vapor mixture flowing upwardly and the cooled condensed hydrocarbon liquid flowing downwardly therein.

As described above in connection with the separator 84 of the apparatus 10, the liquid seal vacuum pump 370 causes the air-hydrocarbon vapor mixture pumped thereby to be cooled and a portion of the hydrocarbon in the cooled mixture to be condensed. The condensed hydrocarbon is separated in the separator 384 and is withdrawn therefrom by way of a condensed hydrocarbon outlet connection 404 therein. A conduit 406 is connected to the connection 404 and to the suction connection of a pump 408. The discharge of the pump 408 is connected to a conduit 410, the other end of which is connected to the inlet connection 412 of a second cooler 414. Like the cooler 392, the cooler 414 is preferably an air cooler, and most preferably, an evaporative air cooler, and functions to cool the condensed hydrocarbon flowing therethrough. The cooled condensed hydrocarbon exits the cooler 414 by way of an outlet connection 416 thereof to which a conduit 418 is connected. The conduit 418 conducts a portion of the condensed hydrocarbon to storage facilities (not shown), and the remaining portion is conducted to an inlet connection in the condenser 400 by a conduit 422 connected between the inlet connection 420 and the conduit 418. A conduit 403 connects a vapor outlet connection 401 in the condenser 400 to the inlet header 304.

Operation of the Apparatus 300

The operation of the apparatus 300 is identical to the operation of the apparatus 10 previously described except that instead of an absorber connected to the 3-phase separator, the apparatus 300 has a hydrocarbon condenser 400 connected to the 3-phase separator 384. Because substantially all of the hydrocarbon vapor can be readily condensed and separated from the mixture of hydrocarbons and air withdrawn from the separator 384, a condensing process and apparatus can be used. That is, condensed hydrocarbons conducted from the separator 384 by the conduit 406 are pumped by the pump 408 through the cooler 414 whereby the condensed hydrocarbons are cooled. A portion of the cooled condensed hydrocarbons are conducted by way of the conduit 422 to the upper portion of the condenser 400. The air-hydrocarbon vapor mixture separated in the separator 384 and flowing upwardly through the condenser 400 is intimately contacted in the packed section 402 thereof by the downwardly flowing cooled condensed hydrocarbon liquid which causes a major portion of the hydrocarbon vapor contained in the mixture to be condensed and separated from the mixture. The separated hydrocarbon liquid passes into the separator 384 from where it is removed by way of the conduit 406, etc. The remaining mixture of air and hydrocarbon vapor exiting the condenser 400 is conducted therefrom by a conduit 403 connected thereto. The conduit 403 is connected to the inlet header 304 whereby the air-hydrocarbon vapor mixture from the condenser 400 is combined with the air-hydrocarbon vapor inlet mixture, etc.

In order to more clearly illustrate the operation of the apparatus of the present invention, the following example is given.

EXAMPLE

A typical gasoline truck loading terminal has the following loading pattern:

| | |
|---|---|
| Maximum Instantaneous Rate | 7,200 gallons/minute |
| Maximum Throughput in 15 Minutes | 51,000 gallons |
| Maximum Throughput in 1 Hour | 153,000 gallons |
| Maximum Throughput in 4 Hours | 459,000 gallons |
| Maximum Throughput Daily | 1,836,000 gallons |

The gasoline loaded is deemed to have the following properties:

| | |
|---|---|
| Summer: | 9 psia RVP, 90° F. maximum |
| Winter: | 12 psia RVP, 60° F. minimum |

It is recognized that the hydrocarbon concentration of the air-hydrocarbon vapor mixture generated by loading gasoline into the truck transports will vary according to gasoline volatility and the degree of air saturation attained.

Based on the above gasoline properties and other experience factors known to those skilled in the art, a design hydrocarbon concentration of 40 Vol.% is selected.

The apparatus 10 is designed for an approximately 15 minute cycle time, and consequently, it is necessary to design each adsorption vessel 12 and 14 to handle a net air-hydrocarbon vapor influent from the truck loading rack of 962 cubic feet per minute and 6818 cubic feet each cycle based on a 1.0 vapor growth factor. Approximately 22000 lbs. of the appropriate activated carbon is chosen and distributed equally in two 9 feet in diameter by approximately 9 feet high adsorption vessels 12 and 14. These two adsorption vessels are operated near ambient temperatures and only slightly above atmospheric pressure during the adsorption cycle.

A lobed rotor vacuum booster pump 68 with a 75 horsepower electric motor and a liquid ring vacuum pump 72 with a 75 horsepower electric motor are provided for regeneration of the beds of carbon after each adsorption cycle. Very effective regeneration of carbon beds 12 and 14 is accomplished each cycle by the introduction of stripping air therein under high vacuum conditions. The regeneration apparatus provided allows attainment of 74 millimeters of mercury absolute pressure each cycle with the liquid seal vacuum pump 72 alone and with the vacuum assist provided by the booster pump 68, an absolute pressure of 25 millimeters of mercury or less can be attained.

An air-hydrocarbon vapor mixture containing from about 80% to about 95% by volume hydrocarbons, i.e., gasoline light ends, are discharged from the vacuum pump 72 to a 2.5 feet diameter by approximately 12 feet high packed absorber 86 integrally connected to a 4.0 feet diameter by approximately 10.0 feet long 3-phase separator 84. The major portion of the hydrocarbon vapors are absorbed and thereby recovered in a downward flowing stream of gasoline within the absorber 86.

The minor portion of hydrocarbon vapors not absorbed into the gasoline absorbent exits the top of the absorber 86. These hydrocarbons flow to whichever adsorber 12 or 14 is in the adsorption mode where they are adsorbed onto the activated carbon. Subsequently, during regeneration of the carbon, they are removed and returned to the absorber 86. Eventually almost all of the hydrocarbon vapors are recovered.

Centrifugal pumps 104 and 122, each with 10 horsepower electric motor drivers are provided to circulate 190 gallons per minute of gasoline from storage facilities for purposes of providing the liquid absorbent for the absorber 86 and to provide the necessary seal fluid cooling medium in the seal fluid cooler 100.

Apparatus 10 designed as described above can be expected to remove and recover the hydrocarbon vapors generated from the transport loading rack such that less than 0.15 milligrams of hydrocarbons will be vented to the atmosphere per liter of gasoline loaded.

Thus, the present invention is well adapted to carry out the objects and attain the ends and advantages mentioned as well as those inherent therein. While presently preferred embodiments of the invention have been described for purposes of this disclosure, numerous changes in the arrangement of process steps and apparatus elements will suggest themselves to those skilled in the art, which changes are encompassed within the spirit of this invention as defined by the appended claims.

What is claimed is:

1. An improved process for recovering hydrocarbons from an inlet air-hydrocarbon vapor mixture comprising the steps of:
   (a) flowing said inlet mixture through a first bed of solid absorbent having an affinity for hydrocarbons whereby hydrocarbons are absorbed on said bed and a residue gas stream comprised of substantially hydrocarbon-free air is produced;
   (b) venting said substantially hydrocarbon-free air to the atomosphere;
   (c) evacuating a second bed of solid absorbent having hydrocarbons absored thereon by vacuum pumping with a liquid seal vacuum pump whereby a major portion of said hydrocarbons are desorbed from said bed and a hydrocarbon-rich air-hydrocarbon vapor mixture is produced;
   (d) further evacuating said second bed by vacuum pumping with a positive displacement booster pump connected upstream and in series with said liquid seal vacuum pump while continuing to pump with said liquid seal vacuum pump whereby additional hydrocarbons are desorbed from said bed;
   (e) removing a major portion of the hydrocarbons contained in the air-hydrocarbon vapor mixture produced in steps (c) and (d) therefrom whereby a residue gas stream comprised of air and a minor portion of hydrocarbons is produced;

(f) combining said residue gas stream produced in step (e) with said inlet air-hydrocarbon mixture of step (a) whereby hydrocarbons contained therein are absorbed on said first bed of solid absorbent; and (g) periodically changing the flow pattern of said inlet air-hydrocarbon mixture and changing the bed of solid absorbent being evacuated whereby when the bed through which the inlet air-hydrocarbon mixture is flowing becomes loaded with absorbed hydrocarbons, the inlet air-hydrocarbon mixture is caused to flow through the bed which has just been evacuated and stripped, said positive displacement booster pump being a continuously operating rotary vacuum blower having a suction and a discharge and hydrocarbon vapor, air, or a mixture thereof being spilled back from the discharge of said blower to the suction of said blower during step (c) using a spillback conduit connected around said blower.

2. The process of claim 1 further comprising the step of introducing a quantity of hydrocarbon-free air into said second bed while evacuating said bed whereby additional hydrocarbons are stripped from said bed and additional air-hydrocarbon mixture is produced.

3. The process of claim 2 wherein:

said first and second beds are each comprised of serially connectable upstream and downstream beds;

said upstream and downstream beds of said second bed are simultaneously and serially evacuated in step (c) by subjecting said upstream and downstream beds to pumping with said liquid seal vacuum pump;

only said upstream bed of said second bed is further evacuated in step (d) by vacuum pumping with both said liquid seal vacuum pump and said positive displacement booster pump connected upstream of and in series with said liquid seal vacuum pump, said downstream bed of said second bed being further evacuated simultaneous to the performance of step (d) by vacuum pumping with only said liquid seal vacuum pump;

a first portion of said hydrocarbon-free air is introduced into said downstream bed while continuing to evacuate said downstream bed by vacuum pumping with only said liquid seal vacuum pump; and a second portion of said hydrocarbon-free air is introduced into said upstream bed while continuing to evacuate said upstream bed by vacuum pumping with both said booster pump and said liquid seal vacuum pump.

4. The process of claim 1 wherein step (e) of removing a major portion of hydrocarbons from the air-hydrocarbon vapor mixture produced in steps (c) and (d) comprises contacting said mixture in an absorber with a liquid absorbent having an affinity for hydrocarbons.

5. The process of claim 4 wherein the hydrocarbons contained in said inlet air-hydrocarbon mixture are vaporized gasoline light ends and the liquid absorbent utilized in step (e) is gasoline.

6. The process of claim 5 wherein said gasoline is pumped to said absorber from a source of stored gasoline.

7. The process of claim 6 wherein said first and second beds of solid absorbent are beds of activated carbon.

8. The process of claim 1 wherein said step (e) of removing a major portion of hydrocarbons from the air-hydrocarbon vapor mixture produced in steps (c) and (d) comprises condensing a major portion of said hydrocarbons in said mixture and separating said condensed hydrocarbons from said mixture.

9. The process of claim 1 wherein the spilling back of said hydrocarbon vapor, air, or mixture thereof from the discharge of said blower to the suction of said blower is discontinued during step (d).

10. An improved process for recovering hydrocarbons from an inlet air-hydrocarbon mixture comprising the steps of:

(a) flowing said inlet mixture through a first bed of activated carbon whereby said hydrocarbons in said mixture are absorbed on said bed and a residue gas stream comprised of substantially hydrocarbon-free air is produced;

(b) venting said substantially hydrocarbon-free air to the atmosphere;

(c) evacuating a second bed of activated carbon having hydrocarbons absorbed thereon by subjecting said bed to pumping with a liquid seal vacuum pump whereby a major portion of said hydrocarbons are desorbed from said bed and a hydrocarbon-rich air-hydrocarbon vapor mixture containing liquid from said liquid sealed vacuum pump and condensed hydrocarbon liquids is produced;

(e) further evacuating said second bed by vacuum pumping with a positive displacement booster pump connected upstream and in series with said liquid seal vacuum pump while continuing to pump with said liquid seal vacuum pump whereby additional hydrocarbons are desorbed from said bed and additional air-hydrocarbon vapor mixture is produced;

(e) introducing hydrocarbon-free air into said second bed while continuing to evacuate said bed by vacuum pumping with said booster pump and said liquid seal vacuum pump whereby additional hydrocarbons are stripped from said bed and additional air-hydrocarbon vapor mixture is produced;

(f) separating the liquid from the liquid seal vacuum pump and the condenses hydrocarbon liquids from each other and from the air-hydrocarbon vapor mixture produced in steps (c), (d) and (e);

(g) cooling the separated liquid seal vacuum pump liquid;

(h) recycling the cooled liquid seal vacuum pump liquid to said liquid seal vacuum pump;

(i) contacting the air-hydrocarbon mixture separated in step (f) in an absorber with a lean liquid absorbent having an affinity for hydrocarbons whereby a major portion of the hydrocarbons are removed therefrom, a hydrocarbon-rich liquid absorbent is produced and a residue gas stream comprised of air and a minor portion of hydrocarbons is produced;

(j) combining the hydrocarbon liquids separated in step (f) with the hydrocarbon-rich liquid absorbent;

(k) combining said residue gas stream produced in step (i) with said inlet air-hydrocarbon mixture of step (a) whereby hydrocarbons contained therein are absorbed on said first bed of solid absorbent; and (l) periodically changing the flow pattern of said inlet air-hydrocarbon mixture and changing the bed of activated carbon being evacuated and stripped whereby when the bed through which the inlet air-hydrocarbon mixture is flowing becomes loaded with absorbed hydrocarbons, the inlet air-hydrocarbon mixture is caused to flow through the bed which has just been evacuated and stripped, said positive displacement booster pump being a continuously operating rotary blower having a suction and a discharge and hydrocarbon vapor, air, or a mixture thereof being spilled back from the discharge of said blower to the suction of said blower during step (c) by way of a spillback conduit connected around said blower.

11. The process of claim 10 wherein the step of cooling the liquid recycled to said liquid seal vacuum pump comprises passing said liquid in heat exchange relationship with a stream of said liquid absorbent.

12. The process of claim 11 wherein the hydrocarbons contained in said inlet air-hydrocarbon mixture are vaporized gasoline light ends and the liquid absorbent utilized in step (i) is gasoline.

13. The process of claim 12 wherein the liquid seal vacuum pump liquid is water.

14. The process of claim 12 wherein the liquid seal vacuum pump liquid is a mixture of water and glycol.

15. The process of claim 12 wherein the hydrocarbon-free air utilized in step (e) is heated prior to introducing it into said bed.

16. The process of claim 12 wherein the source of lean gasoline utilized in step (i) is a gasoline storage facility and said mixture of hydrocarbon-rich gasoline and separated hydrocarbon liquids of step (j) are conducted to a gasoline storage facility.

17. An improved process for recovering hydrocarbons from an inlet air-hydrocarbon vapor mixture comprising the steps of:
   (a) flowing said inlet mixture through a first bed of solid absorbent having an affinity for hydrocarbons whereby hydrocarbons are absorbed on said bed and a residue gas stream comprised of substantially hydrocarbon-free air is produced;
   (b) venting said substantially hydrocarbon-free air to the atmosphere;
   (c) evacuating a second bed of solid absorbent having hydrocarbons absorbed thereon by vacuum pumping with a liquid seal vacuum pump whereby a major portion of said hydrocarbons are desorbed from said bed and a hydrocarbon-rich air-hydrocarbon vapor mixture is produced;
   (d) further evacuating said second bed by vacuum pumping with a positive displacement booster pump connected upstream and in series with said liquid seal vacuum pump while continuing to pump with said liquid seal vacuum pump whereby additional hydrocarbons are desorbed from said bed;
   (e) introducing a quantity of hydrocarbon-free air into said second bed while evacuating said second bed whereby additional hydrocarbons are stripped from said second bed and additional air-hydrocarbon mixture is produced;
   (f) removing a major portion of the hydrocarbons contained in the air-hydrocarbon vapor mixture produced in steps (c), (d), and (e) therefrom whereby a residue gas stream comprised of air and a minor portion of hydrocarbons is produced;
   (g) combining said residue gas stream produced in step (f) with said inlet air-hydrocarbon mixture of step (a) whereby hydrocarbons contained therein are absorbed on said first bed of solid absorbent; and
   (h) periodically changing the flow pattern of said inlet air-hydrocarbon mixture and changing the bed of solid absorbent being evacuated whereby when the bed through which the inlet air-hydrocarbon mixture is flowing becomes loaded with absorbed hydrocarbons, the inlet air-hydrocarbon mixture is caused to flow through the bed which has just been evacuated and stripped, wherein:

said first and second beds are each comprised of serially connectable upstream and downstream beds;

said upstream and downstream beds of said second bed are simultaneously and serially evacuated in step (c) by subjecting said upstream and downstream beds to pumping with said liquid seal vacuum pump;

only said upstream bed of said second bed is further evacuated in step (d) by vacuum pumping with both said liquid seal vacuum pump and said positive displacement booster pump connected upstream of and in series with said liquid seal vacuum pump, said downstream bed of said second bed being further evacuated simultaneous to the performance of step (d) by vacuum pumping with only said liquid seal vacuum pump;

a first portion of said hydrocarbon-free air is introduced into said downstream bed in step (e) while continuing to evacuate said downstream bed by vacuum pumping with only said liquid seal vacuum pump; and a second portion of said hydrocarbon-free air is introduced into said upstream bed in step (e) while continuing to evacuate said upstream bed by vacuum pumping with both said positive displacement booster pump and said liquid seal vacuum pump.

* * * * *

UNITED STATES PATENT AND TRADEMARK OFFICE
CERTIFICATE OF CORRECTION

PATENT NO. : 5,154,735

DATED : October 13, 1992

INVENTOR(S) : Harold L. Dinsmore et al.

It is certified that error appears in the above-identified patent and that said Letters Patent is hereby corrected as shown below:

Column 16, line 48, delete "absorbent" and substitute the word
    --adsorbent-- therefor;
Column 16, line 49, delete "absorbed" and substitute the word
    --adsorbed-- therefor;
Column 16, line 54, delete "absorbent" and substitute the word
    --adsorbent-- therefor;
Column 16, line 55, delete "absored" and substitute the word
    --adsorbed-- therefor;
Column 17, line 6, delete "absorbed" and substitute the word
    --adsorbed-- therefor;
Column 17, line 6, delete "absorbent" and substitute the word
    --adsorbent-- therefor;
Column 17, line 10, delete "absorbent" and substitute the word
    --adsorbent-- therefor;
Column 17, line 13, delete "absorbed" and substitute the word
    --adsorbed-- therefor;
Column 18, line 2, delete "absorbent" and substitute the word
    --adsorbent-- therefor;
Column 18, line 19, delete "absorbed" and substitute the word
    --adsorbed-- therefor;
Column 18, line 25, delete "absorbed" and substitute the word
    --adsorbed-- therefor;
Column 18, line 32, delete "(e)" and substitute --(d)-- therefor;
Column 18, line 66, delete "absorbed" and substitute the word
    --adsorbed-- therefor;
Column 18, line 66, delete "absorbent" and substitute the word
    --adsorbent-- therefor;
Column 19, line 6, delete "absorbed" and substitute the word
    --adsorbed-- therefor;
Column 19, line 40, delete "absorbent" and substitute the word
    --adsorbent-- therefor;

UNITED STATES PATENT AND TRADEMARK OFFICE
CERTIFICATE OF CORRECTION

PATENT NO. : 5,154,735
DATED : October 13, 1992
INVENTOR(S) : Harold L. Dinsmore et al.

It is certified that error appears in the above-identified patent and that said Letters Patent is hereby corrected as shown below:

Column 19, line 41, delete "absorbed" and substitute the word
--adsorbed-- therefor;
Column 19, line 46, delete "absorbent" and substitute the word
--adsorbent-- therefor;
Column 19, line 47, delete "absorbed" and substitute the word
--adsorbed-- therefor;
Column 20, line 18, delete "absorbed" and substitute the word
--adsorbed-- therefor;
Column 20, line 18, delete "absorbent" and substitute the word
--adsorbent-- therefor;
Column 20, line 22, delete "absorbent" and substitute the word
--adsorbent-- therefor; and
Column 20, line 25, delete "absorbed" and substitute the word
--adsorbed-- therefor.

Signed and Sealed this

Twenty-eighth Day of September, 1993

Attest:

BRUCE LEHMAN

*Attesting Officer*       *Commissioner of Patents and Trademarks*